United States Patent
Almgren et al.

(10) Patent No.: US 6,310,872 B1
(45) Date of Patent: Oct. 30, 2001

(54) PACKET SWITCHING IN A CELLULAR RADIO COMMUNICATION SYSTEM

(75) Inventors: Magnus Almgren; Per Larsson, both of Sollentuna (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 09/102,674

(22) Filed: Jun. 23, 1998

(30) Foreign Application Priority Data

Jun. 27, 1997 (SE) .................................................... 9702493

(51) Int. Cl.[7] .................................................... H04L 12/26

(52) U.S. Cl. .................................................... 370/349; 455/422

(58) Field of Search .................................... 370/218, 349; 455/422, 423, 432

(56) References Cited

U.S. PATENT DOCUMENTS

| | | | |
|---|---|---|---|
| 4,979,168 | 12/1990 | Courtois et al. | 370/349 |
| 5,715,516 | * 2/1998 | Howard et al. | 455/422 |
| 6,219,547 | * 4/2001 | Qaddoura et al. | 455/432 |

FOREIGN PATENT DOCUMENTS

| | | |
|---|---|---|
| 0 432 315 | 6/1991 | (EP) . |
| 0 462 572 | 12/1991 | (EP) . |
| 0 507 626 | 10/1992 | (EP) . |
| 0 524 675. | 1/1993 | (EP) . |
| 94/05094 | 3/1994 | (WO) . |
| 96/04725 | 2/1996 | (WO) . |
| 96/33586 | 10/1996 | (WO) . |
| 9900947 | * 12/2000 | (WO) . |

OTHER PUBLICATIONS

Borgonovo et al., "Performance of Capture–Division Packetized Access (CDPA) with Partial Frequency Reuse and Power Control", IEEE, May 1995, pp. 1141–1146.

Hajek et al., "Decentralized Dynamic Control of Multi-access Broadcast Channel", IEEE Transactions on Automatic Control, vol. AC–27, No. 3, Jun. 1982, pp. 559–569.

LaMaire et al., "Optimization of Capture in Multiple Access Radio Systems with Rayleigh Fading and Random Power Levels", MMT Conference Proceedings, May 1996, pp. 321–336.

* cited by examiner

Primary Examiner—Salvatore Cangialosi
(74) Attorney, Agent, or Firm—Burns, Doane, Swecker & Mathis, L.L.P.

(57) ABSTRACT

The present invention relates to a device and a method for packet switching in a cellular radio communication system. Radio stations that have packets to transmit, transmit packets with a particular transmission probability ($S_{i,n}$). The fraction of the transmitted packets that are received correctly by the receiving radio station, the so-called throughput fraction ($t_{i,n}$), can be calculated. The transmission probability ($S_{i,n}$) for a transmitting radio station is continuously updated according to a mapping function (f(a)) that depends on the value of the throughput fraction ($t_{i,n}$). According to the invention a mapping function (f(a)), with a derivative with an absolute value less than one, is chosen (201). Starting values of the throughput fraction ($t_{i,n}$) are generated (203) and these values are input to the mapping function. Updated values of the transmission probability ($S_{i,n}$) are generated (204) by mapping function. The transmitting radio station transmits (205) packets according to the updated transmission probability, whereby a new value of the throughput fraction is generated (206). The method is repeated until the values of the throughput fraction are stable.

13 Claims, 4 Drawing Sheets

US 6,310,872 B1

PACKET SWITCHING IN A CELLULAR RADIO COMMUNICATION SYSTEM

TECHNICAL FIELD

The present invention relates to packet switching in a cellular radio communication system, in particular to a device and a method for transmission of packet data in each cell, so that the system is stabilized relating to co-channel interference.

PRIOR ART

In a cellular radio communication system with packet data switching there is no dedicated connection for each packet switching. When a transmitting station wishes to transmit a packet, it should be able to use as much capacity as is needed depending on what the system can handle. One or more channels can for instance be dedicated for packet data switching in the entire radio communication system. Then, all transmitting radio stations can use said channel or channels when they need to transmit packet data. Then, the remaining channels can for instance be used for transfer of circuit-switched speech. The packet data stream within a cell is not continuous but in the form of bursts. It may happen that the same channel is used simultaneously within more than one cell for transfer of packet data. This implies that co-channel interference is introduced. If a packet contains a too high noise level relating to the interference, the reception of the packet will fail.

If the reception of a packet fail, the packet must be retransmitted at a later moment. There are different known strategies for how retransmission of failed packets shall be performed, so that the risk of a new collision is decreased. There are also strategies for how the transmission shall be controlled, so that collisions are avoided or the risk of collision decreases.

One known retransmission strategy is the so-called ALOHA protocol. According to the ALOHA protocol packets, which earlier failed after a randomly chosen time period are retransmitted. If the transmission does not succeed this time either, the packet is retransmitted once again according to the same strategy.

One drawback with this retransmission strategy is that the packets can be retransmitted infinitely many times. Each time a packet is retransmitted it means that co-channel interference for other packets, which are transmitted simultaneously on the same channel in the system will increase. In a system with many users, only using ALOHA protocols, the same packets can be transmitted again and again from different transmitters. In principle all transmission stations can transmit packets simultaneously without any packet being received correctly. Therefore, such a system becomes unstable relating to co-channel interference. To improve the stability, some further control scheme must be used.

Another protocol to be used in a packet switching system to avoid collision is the so-called CSMA protocol (Carrier Sense Multiple Access). According to this protocol, a station having a packet to transmit, listens on the channel to be used for transmitting said packet. If the channel is idle, the packet is transmitted with a probability s. If the channel is not idle, the station waits until the channel is idle and then transmits the packet with a transmission probability s.

In EP-A-0432 315 a system and a method of controlling the access rate in stations in a packet transferring network are disclosed. The system comprises a number of transmitting and receiving stations, which are able to communicate mutually according to a directing scheme. Access rate represents the rate at which a transmitting station transmits packets in an ALOHA network, or the rate at which a transmitting station senses the status of the channel in a CSMA network. In each station a first parameter is calculated relating to the number of successfully transmitted packets per unit of time. Further a second parameter is calculated relating to the input flow, depending on the output flow from adjacent stations. A third parameter is calculated relating to the load of the station. The calculated parameters are transmitted to all adjacent stations. In each station the parameters are compared and the access rate is changed depending on the parameters. By controlling the transmission rate in each station, the throughput in the system is increased.

In US-A-4979168 a packet switching system according to the CSMA protocol is disclosed. Before a packet is transmitted, the system controls if the channel which the packet should be transmitted on is idle. If the channel is busy, a new point in time is determined for sensing the channel, which point in time is randomly selected within a dynamically determined time interval. The dynamically determined time interval is depending on the mean time the channel is idle. If the channel is idle, the packet is transmitted. According to this invention, the transmission in question is controlled relating to avoiding collision.

A drawback with this method is that no consideration is taken to, if the station that wishes to transmit packets has failed or succeeded to transfer the packets to the receiver at previously attempts. Thus, a station that has often failed with transmission can continue to fail.

DISCLOSURE OF THE INVENTION

The present invention relates to a problem how the packet transmission from a transmitting station shall be controlled depending on the present knowledge of the transmitting station, so that the transmission becomes fair both to stations successful in transmitting many packets, as well as stations not successful in transmitting an equal amount of packets.

Another problem is how to control transmission of packet data in a cellular radio communication system, so that the co-channel interference in the system is stabilized.

Thus, an object of the present invention is to control the transmission of packets, so that the transmission of packet data from different transmitting stations become fair. Fair relates to that transmitting stations, in which transmitted packets have low fraction of successful receptions not entirely ought to stop transmitting packets for the benefit of transmitting stations, in which transmitted packets have a higher fraction of successful receptions. Another object is to control the transmission in a packet switching mobile radio communication system, so that the co-channel interference in the system is stabilized.

The problems are solved by each transmitting station transmitting with a certain transmission probability, being updated after each transmission depending on how large fraction of the transmitted packets have been received correctly. The updating occurs according to a functional dependability having values between zero and one and whose derivative is less than one.

In particular the problems are solved by initially determining a transmission probability for each radio station, transmitting packet data in a mobile radio communication system. Thereafter each radio station transmit packet data according to said determined transmission probability. Thereafter, a value of the fraction of transmitted packets, correctly received in relation to the number of transmitted packets, for each transmitting station, is determined. This fraction is in the following related to as throughput fraction.

The transmission probability is updated for each transmission station after each transmitted packet. The updated value is determined depending on the value of the throughput fraction according to a predetermined function. This function hereinafter is referred to as mapping function. The mapping function has values higher than zero and less than one and its derivative is less than 1 in all points.

By choice of a mapping function having that configuration, the values of the throughput fraction will after a while reach an equilibrium in the system, whereby the system is stabilized relating to co-channel interference. When the system is stable all radio stations will be allowed to transmit packet data. The radio stations, which have low values of the throughput fraction will have lower transmission probability than those radio stations, which have had higher values on the throughput fraction. No radio station will achieve transmission probabilities reaching the values zero or one.

An advantage of the invention is that the transmission of packet data is controlled so that the radio communication system is stabilized relating to co-channel interference.

Yet an advantage of the invention is that the transmission is controlled so that all transmitting stations are allowed to transmit packet data, even they that have lower fraction of correctly received packets.

The invention will now be described in more detail with reference to preferred embodiments and illustrated in the appended drawings.

PREFERRED EMBODIMENTS

Figure 1:
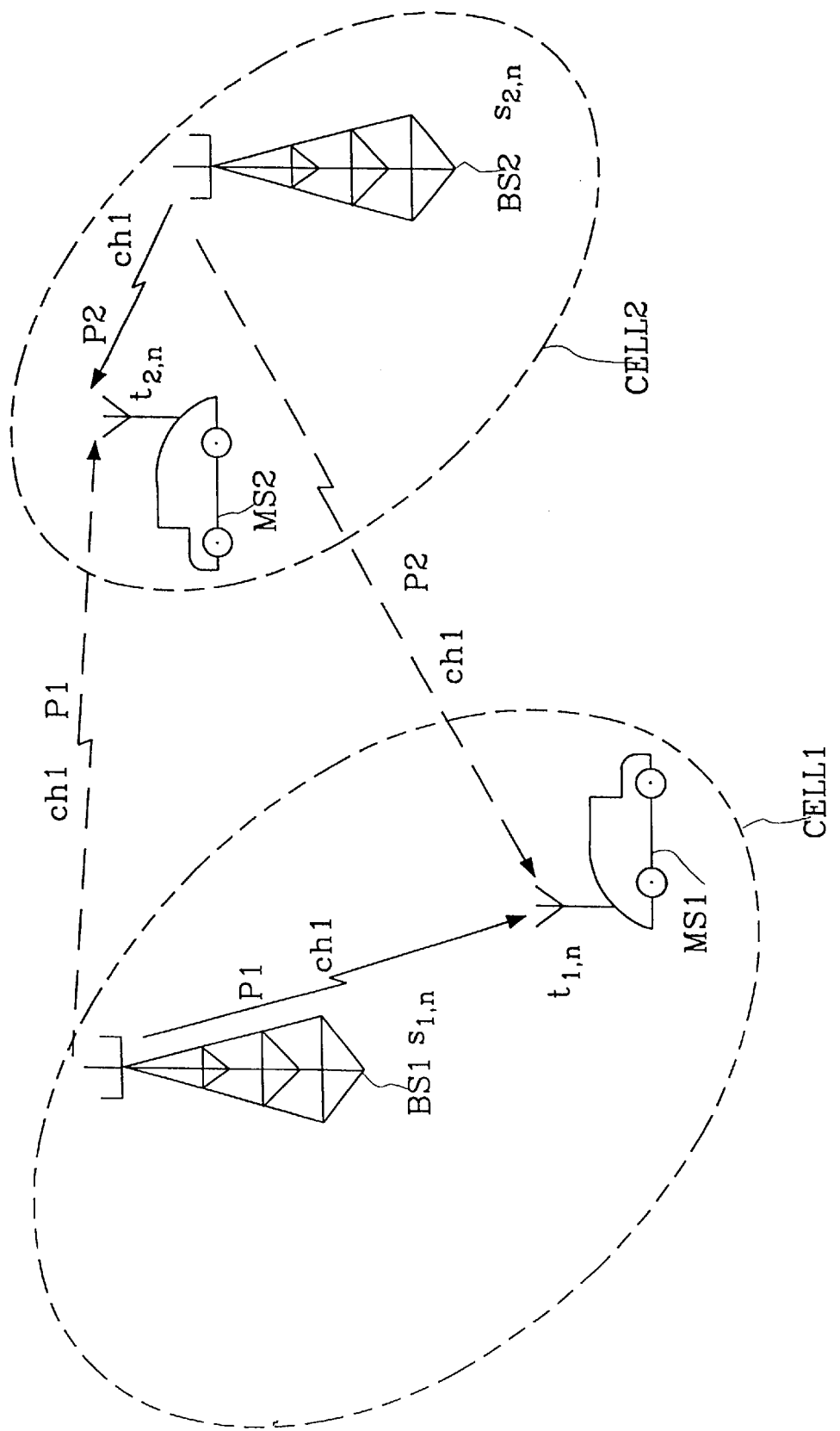
FIG. 1 illustrates in a schematic drawing the development of cochannel interference in a packet switching mobile radio communication system.

In a cellular radio communication system with packet data switching, each cell can for instance use a particular channel for the packet data switching. There may be one or more such channels in the radio communication system. Packet data is transmitted in bursts and the transmission rate from a base station or a mobile station, transmitting packet data can be described by a transmission probability. This transmission probability gives the fraction of a time period, a transmitting station transmits packets.

If the same channel is used simultaneously by at least two simultaneously transmitting stations, i.e., base stations or mobile stations, for packet data transmission, the receiving station will receive contribution from both transmissions, whereby co-channel interference is introduced. If the co-channel interference, combined with possible other interference, is sufficiently high, the reception of the packet will fail. The base station or mobile station transmitting the packet, whose reception was failed, is informed that the packet has not been correctly received by the receiver. Then, the packet must be retransmitted at a later moment.

In each cell the fraction of the packets, of the total number of transmitted packets, actually arriving at the receiver can be calculated. This fraction is referred to as the throughput fraction. It is possible to calculate a value of the throughput fraction relating to the fraction correctly received packets in a cell, alternatively the fraction correctly received packets for each transmitting radio station in a cell. Calculation of values on the throughput fraction can, according to an embodiment of the invention, be based on registration of the number of correctly received packets and the number of failed received packets.

The radio stations, i.e., the base stations and mobile stations, having packets to transmit, transmit with a certain transmission probability $S_i$. This implies that the transmitting radio station transmits packets $S_i*100\%$ of the time. An assumption is of course that there is packets to transmit.

According to the present invention, the transmission probability $S_{i,n+1}$ in a certain point n+1 is updated for the transmitting radio station depending on the value on the throughput fraction $T_i$, n in an earlier point of time n thereof. The object of controlling the transmission probability is to distribute the possibility of transmitting, fairly within the radio communication system. The transmitted packets of an transmitting station being correctly received time after time can otherwise entirely disturb a transmitting station, whose packets are not correctly received to such an extent, if the transmission is not controlled.

If a first transmitting station having succeeded to transfer a large fraction of its transmitted packets correctly, would be allowed to increase its transmission probability at each time, this would result in that transmitting stations being disturbed of the first station will have a decreased fraction correctly transferred packets and in the end will stop to transmit totally. According to the present invention, the transmission in the radio communication system is controlled in such a way that a radio station succeeding in transferring many packets, despite that is not allowed to increase its transmission probability maximally, by advantage to the stations having transferred less packets.

Thus, the updated transmission probability $S_{i,n+1}$ is calculated according to the present invention as a function of the value of the throughput fraction $t_{i,n}$ an earlier point of time as below:

$$S_{i,n+1}=f(t_{i,n}) \tag{1}$$

The functional dependability the updating of the transmission probability takes is in the following referred to as mapping function f(a), a being an input variable. According to the invention the absolute value of the derivative of the mapping function f'(a) must be less than one. This means, as is illustrated in the following, that the mapping function after a while will reach an equilibrium value where the values of the throughput fraction for all cells in the system is substantially constant. According to the present invention, the input variable a, is as previously disclosed a value on the throughput fraction $S_{i,n+1}$.

It is assumed in the following the description that no collisions within the own cell occurs, i.e., a base station does not transmit packets simultaneously on the same channel to two different mobile stations in one cell. Furthermore, it is assumed that the attenuation in the radio communication system is constant, and that the transmission of packet data is synchronised in the radio communication system, so that packets, which are transmitted simultaneously in different cells have the same starting time.

Below, an example of a method of the invention will be described with reference to FIG. 1. In FIG. 1 two cells are illustrated, CELL1, CELL2 in a radio communication system being able to transfer packet data. In each cell there is a base station BS1, BS2, being able of transmitting packet data P1, P2 to a mobile station MS1, MS2 via a channel ch1. It is understood in the present example that both base stations have packets stored in a queue, which they want to transmit. To better illustrate the invention, the present example will only be described relating to packet transmission in the down link, i.e., from a base station to a mobile station in the cell.

According to the example, the base station BS1 transmits data packets to the mobile station MS1 with a certain transmission probability $s_{1,n}$ at a certain point of time n, i.e., it transmits packets P1 $s_{1,n}$*100% of the time. The data packets to be transmitted are arranged in some form of queue. The base station BS2 transmits correspondingly packets P2, at a certain point of time n, with a transmission probability $s_{2,n}$ to the mobile station MS2. Each receiving mobile station MS1, MS2 registers and informs the transmitting base station if the transmitted packet has been correctly received or not. Thereby, each base station can calculate its throughput fraction $t_{1,n}$, $t_{2,n}$, i.e., the fraction correctly received packets of the transmitted packets under a period of time. The calculation of the throughput fraction can also occur in the mobile station, which then transfers the value of the throughput fraction to the base station. A packet, which has not been received correctly and must be retransmitted, is replaced in the queue of packets.

In the present example it is understood that the mobile station MS1 is within the so-called capture-distance for the cell CELL2, and the mobile station MS2 is within the capture-distances for the cell CELL1; a receiver positioned within a the capture distance of a transmitter means herein that packets, which are transmitted from said transmitter will contribute with as much co-channel interference in the receiver that the packet, which is transmitted in the own cell is disturbed so much that the packet is not correctly received. If both base stations BS1, BS2 transmit packets simultaneously, the reception is thereby failed of both packets according to the present example.

The value of the throughput fraction $t_{1,n}$ for the base station BS1 at a certain point of time n thereby depends on, according to the present example, the transmission probability value $S_{2,n}$ for the base station BS2 at said point of time n, according to the following equations:

$$t_{1,n}=1-s_{2,n} \quad (2)$$

$$t_{2,n}=1-s_{1,n} \quad (3)$$

According to equation (1), the following relation is valid:

$$s_{1,n+1}=f(t_{1,n}); \ 0<t_{1,n}<1 \quad (1a)$$

$$s_{2,n+1}=f(t_{2,n}); \ 0<t_{2,n}<1 \quad (1b)$$

If equation. (1b) is put into equation (2) and thereafter the equation (3) is put into equation. (2) the following equation is given:

$$t_{1,n}=1-f(1-s_{1,n-1}) \quad (4)$$

After inserting equation (1a) into equation. (4) the following equation is achieved:

$$t_{1,n}=1-f(1-f(t_{1,n-2})) \quad (5)$$

This equation can be generalized to:

$$t_{i,n}=1-f(1-f(t_{i,n-2})) \quad (5a)$$

In the present case, the value of the throughput fraction ti, depends on a term $f(1-f(t_{i,n-2}))$. The mapping function f(a) is defined for values of the variable a, i.e., the throughput fraction $t_{i,n}$, which are higher than 0 and less than 1. It is understood from the equation (5a) that the value of the throughput fraction $t_{i,n}$ will be stabilized if the absolute value of the derivative f'(a) of the mapping function is less than 1, in the defined area.

As the mapping function f(a) gives output to be used for updating the transmission probability, the output value of the mapping function must reach values between 0 and 1.

If the mapping function reach the value 0, this means that no transmission will take place and thereby no value is given on the throughput fraction. To be able to generate a value of the throughput fraction in such a case, for instance interference values can be studied. If the mapping function reaches the value 1, this means that the transmitting station transmits packets the entire time, which means that co-channel interference for other transmitting stations, transmitting packets on said channel will increase and then the reception for remaining transmitted packets can be blocked.

Therefore, it is preferred that the mapping function is allowed to reach values higher than 0 and less than 1, but not the values 0 and 1.

Figure 2:
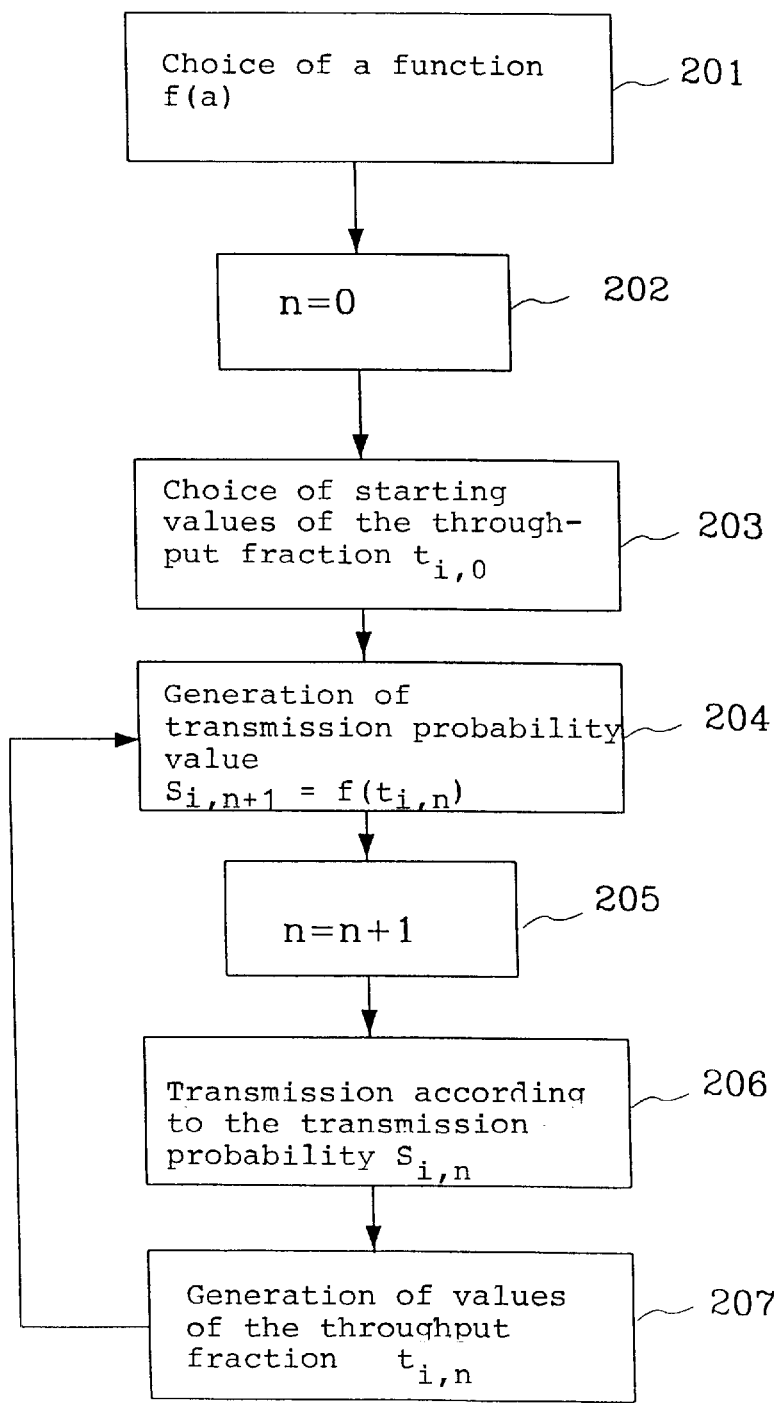
FIG. 2 illustrates a flow chart of an embodiment of the invention.

In FIG. 2 there is shown a flow chart illustrating the method according to an embodiment of the invention. According to the present embodiment in a first step 201 the appearance of the mapping function is chosen according to which updated values of the transmission probability shall be calculated. The working area of the mapping function f(a) is defined for values on an input variable a between 0 and 1. The mapping function f(a) is chosen so its derivative in all points in the working area is less than one, and so the mapping function reaches values higher than zero and less than one, as below:

$$0<f(a)<1; \ 0<a<1 \quad (6)$$

$$|f'(a)|<1; \ 0<a<1 \quad (7)$$

According to the present embodiment, the mapping function f(a) is chosen as a linear function with a coefficient of inclination of 0,5 as below:

$$f(a)=0,5a+0,3 \quad (8)$$

This implies that the lowest value the updated transmission probability can reach is 0,3.

It may be desirable that the mapping function f(a) has a lowest threshold value and said threshold value can then be chosen by for instance studying theoretical calculations of predicted values of the throughput fraction. The chosen mapping function f(a) should in such a case near the theoretical appearance for the throughput fraction.

An index of time n is put 202 initially to zero, n=0.

Thereafter, is generated 203 for each transmitting station, i.e., for the base stations BS1 and BS2, starting up values $t_{i,0}$ of the throughput fraction, in present case $t_{1,0}$ and $t_{2,0}$. These values can reach values between 0 and 1.

The starting up values of the throughput fraction can be chosen, for instance depending on generated or estimated interference values. If the interference is high for a connection, a low starting up value is chosen of the throughput fraction and vice versa.

As previously disclosed updated values of the transmission probability may at a certain point of time n result from the mapping function by letting the input variable a reach values of the throughput fraction in an earlier point of time, i.e., $S_{i,n+1}=f(t_{i,n})=0,5t_{i,n}+0,3$. Thus, values of the transmission probability $s_{i,n+1}$ in the present case $s_{11}$, $S_{21}$, are generated 204 by inserting the generated values of the throughput fraction $t_{1,0}$, $t_{2,0}$ in said mapping function f(a).

In the present example, this implies that the transmission probabilities for the two base stations BS1 and BS2 are represented as $s_{1,1}=0,5t_{1,0}+0,3$ and $s_{2,1}=0,5t_{2,1}+0,3$, when the first index relates to the identity of the base station and the other index relates to the index of time.

Thereafter, is calculated 205 after a period of time, index of time n to n+1.

Thereafter, transmits 206 each base station packets at said point of time n according to said updated determined transmission probability $s_{i,n}$.

Thereafter, n values is generated 207 at said index of time n of the throughput fraction $t_{1,n}$, $t_{2,n}$ when the base stations BS1 and BS2 transmit packet data according to the updated transmission probabilities values.

In the present examples it is understood that the relations according to equation (2) and (3) are valid, whereby the values of the throughput fraction can be calculated theoretically to illustrate the effect of the method. In a common mobile radio communication system with packet data switching, the transmission probability does not have to be such a simple function of the value of the throughput fraction.

Values of the throughput fraction can for instance be generated by registering the number of messages about the number of packets, in which reception has succeeded or failed, during a moment of time. Hereby, the value of the throughput fraction for a transmitting radio station can be calculated as the ratio of the number of successful received packets and the total number of transmitted packets. Values of the throughput fraction can be determined for each transmitted packet or for a number of packets, being transmitted during a period of time.

The throughput fraction can either be calculated in the transmitting station or in the receiving station. Thereafter, the method is repeated from step 204, whereby the values of the transmission probability for the transmitting base stations are continuously updated.

After a period of time, herein indexed with k, the values of the transmission probability will adjust to an equilibrium value, i.e., $s_{i,n+1}=s_{i,n}$. Also the values of the throughput fraction will adjust to an equilibrium, i.e., $t_{i,n+1}=t_{i,n}$. According to the present example, the values of the throughput fraction $t_{1,k}$ and $t_{2,k}$ at a point of time k for both of the base stations will adjust to constant and equal large values.

Below, a theoretical example according to the present embodiment will be described. The starting value at n=0 of the throughput fraction $t_{1,0}$ for the base station BS1 is chosen in the present example to 0,2 and the starting value of the throughput fraction $t_{2,0}$ for the base station BS2 is chosen to 0,8. As these values of the throughput fraction are introduced in equation. (8), at index of time n=1, the transmission probability $s_{1,1}=0,4$ for the base station BS1 and the transmission probability $s_{2,1}=0,7$ for the base station BS2 are achieved.

To illustrate the effect of the transmission strategy, in the present example different values of the throughput fraction $t_{1,n}$, $t_{2,n}$ are calculated theoretically according to above disclosed equations (2) and (3). Below is shown a first table over the result of the method according to the invention of the present example.

TABLE 1

| | $S_{1,n}$ | $S_{2,n}$ | $t_{1,n}$ | $t_{2,n}$ |
|---|---|---|---|---|
| n = 0 | | | 0,2 | 0,8 |
| n = 1 | 0,4 | 0,7 | 0,3 | 0,6 |
| n = 2 | 0,45 | 0,60 | 0,40 | 0,55 |
| n = 3 | 0,500 | 0,575 | 0,425 | 0,500 |
| n = 4 | 0,5125 | 0,5500 | 0,4500 | 0,4875 |
| n = 5 | 0,52500 | 0,54375 | 0,45625 | 0,47500 |
| . | . | . | . | . |
| . | . | . | . | . |
| . | . | . | . | . |
| n = k | 8/15 | 8/15 | 7/15 | 7/15 |

Thus, the values of the throughput fraction and the values of the transmission probability are stabilized to constant values. It is evident that the mapping function f(a) can have other appearance than the proposed one, as long as the function fulfills the demands according to the equations (5) and (6). The appearance of the mapping function can vary within the frames of the equations (5) and (6), which implies that also other functions than a straight line of course is possible.

It can be shown that if the absolute value of the derivative f'(a) of the mapping function f(a) is higher than 1, the base station having the lower transmission probability will have lower transmission probability, while the base station BS2 with the higher transmission probability will have higher transmission probability.

The case described in the example above where the transmission from two base stations disturb each other if the transmission occurs simultaneously is an idealized case and from disturbing point the worst case.

Another case occurs when two base stations simultaneously transmit packets to two different base stations, whereby both packets are correctly received. Independent of which transmission probability the base stations transmit according to, the values of the throughput fraction $t_{1,n}$ and $t_{2,n}$ will equal 1.

Below, a theoretical example according to the present embodiment will be described. Also in this example, it is understood that the mapping function f(a) is chosen as f(a=)=0,5a+0,3. The starting value at index of time n=0 of the throughput fraction $t_{1,0}$ for the base station BS1 is chosen also in the present example to 0,2 and the starting value of the throughput fraction $t_{2,0}$ for the base station BS2 is chosen to 0,8. As these values of the throughput fraction are introduced into equation. (8) at index of time n=1, the transmission probability $s_{1,1}=0,4$ for the base station BS1 and the transmission probability $s_{2,1}=0,7$ for the base station BS2 are achieved, as showed in table 2 below.

TABLE 2

| | $s_{n,1}$ | $s_{2,n}$ | $t_{1,n}$ | $t_{2,n}$ |
|---|---|---|---|---|
| n = 0 | | | 0,2 | 0,8 |
| n = 1 | 0,4 | 0,7 | 1 | 1 |
| n = 2 | 0,8 | 0,8 | 1 | 1 |
| . | . | . | . | . |
| . | . | . | . | . |
| . | . | . | . | . |
| n = k | 0,8 | 0,8 | 1 | 1 |

According to the present examples, the system is stabilized relatively quickly, whereby the values of the transmission probabilities $s_{1,k}$ and $s_{2,k}$ for both base stations are 0,8 and whereby the values of the throughput fraction $t_{1,k}$ and $t_{2,k}$ for both base stations are 1.

Yet another case occurs when two base stations simultaneously transmit to two different mobile stations, whereby just the reception of one of the packets is failed due to too high co-channel interference. In the present case, the method according to the invention will imply that the base station, in which transmissions are successful, will have a high transmission probability. The base station, whose packets are not correctly received as the base stations transmit packets simultaneously, will also achieve a lower transmission probability, but it will have to transmit, which differs from if the derivative of the mapping function had been higher than 1.

To illustrate that case it is assumed that the same mapping function used in the present described example is employed, i.e., $s_{i,n+1}=f(t_{i,n})=0,5t_{i,n}+0,3$. It is assumed that one of the base stations BS1 is successful to transmit all packets, i.e., its value of the throughput fraction $t_1$ is always one, and the other base station BS2 does not get it packets through if the base station BS1 transmits packets simultaneously, i.e., its value of the throughput fraction $t_{2,n}$ is equal to $1-s_{1,n}$.

$$t_{1,n}=1 \quad (9a)$$

$$t_{2,n}=1-s_{1,n} \quad (9b)$$

Below in table 3, is shown the theoretically calculated result of the method according to invention, as the starting value of the throughput fraction is $t_{1,0}=0,4$ and $t_{2,0}=0$ and as the values of the throughput fraction is calculated theoretically according to the equations (9a) and (9b).

TABLE 3

|  | $s_{n,1}$ | $S_{2,n}$ | $t_{1,n}$ | $t_{2,n}$ |
| --- | --- | --- | --- | --- |
| n = 0 |  |  | 0,2 | 0,8 |
| n = 1 | 0,4 | 0,7 | 1 | 0,6 |
| n = 2 | 0,8 | 0,6 | 1 | 0,2 |
| n = 3 | 0,8 | 0,4 | 1 | 0,2 |
| . | . | . | . | . |
| . | . | . | . | . |
| . | . | . | . | . |
| n = k | 0,8 | 0,8 | 1 | 0,2 |

In the present example, the base station BS1, which always get its packets through, is going to transmit packets with a transmission probability, not reaching the maximum value 1, but the value 0,8. Nevertheless, the base station BS2 having a lower value of the throughput fraction will transmit packets of a transmission probability of 0,4.

Independently of which starting values are chosen of the throughput fraction $t_{1,0}$ and $t_{2,0}$, the result had been the same in the present example. This implies that the base station BS1 is succeeded in transmitting packets received each time despite that does not increase its transmission probability to the maximum value one, in benefit of the base station BS2, in which packets have been correctly received less often.

Normally, a cellular radio communication system comprises a large number of cells and the interference situation then is more complicated than the one described above. It is for instance possible that a packet is correctly received despite an other packet is transmitted simultaneously from a transmitting station within the capture distance for the former. This may occur when the coded information in the transferred packets during the higher fraction of the simultaneous transmission differs.

It may also occur that the reception of a packet being transmitted from a first transmitting station is failed despite no other transmitting station within the capture distance of the first station transmits packets simultaneously. Then it may occur that a plurality of transmitting stations, which are not within the capture distance of the first station transmits packets simultaneously, whereby the sum of the interference these packets introduce, destroy the reception of the first packet.

It may also occur that the transmission of packets from different stations within the radio communication system is asynchronous. This implies that two transmitting stations, transmitting packets, do not have to begin transmission of their packets simultaneously, but delayed in time, whereby the interfering pattern becomes more complicated.

Nevertheless, the method according to the invention will result in a stable system relating to co-channel interference independently of how the interference pattern from different stations looks like. A stable system is referred to as a system where the transmission probability and therewith the throughput fraction for different transmitting stations will be controlled to a stable setting, whereby the system is stabilized relating to co-channel interference.

It is obvious that the higher radio communication system and the more stations transmitting simultaneously, the more complicated interference pattern can be obtained.

Above, the method according to the invention was described when packets from base stations are transmitted to mobile stations. It is obvious to a person skilled in the art that a corresponding method can be used for transmission of packets from a mobile station to a base station.

Figure 3:
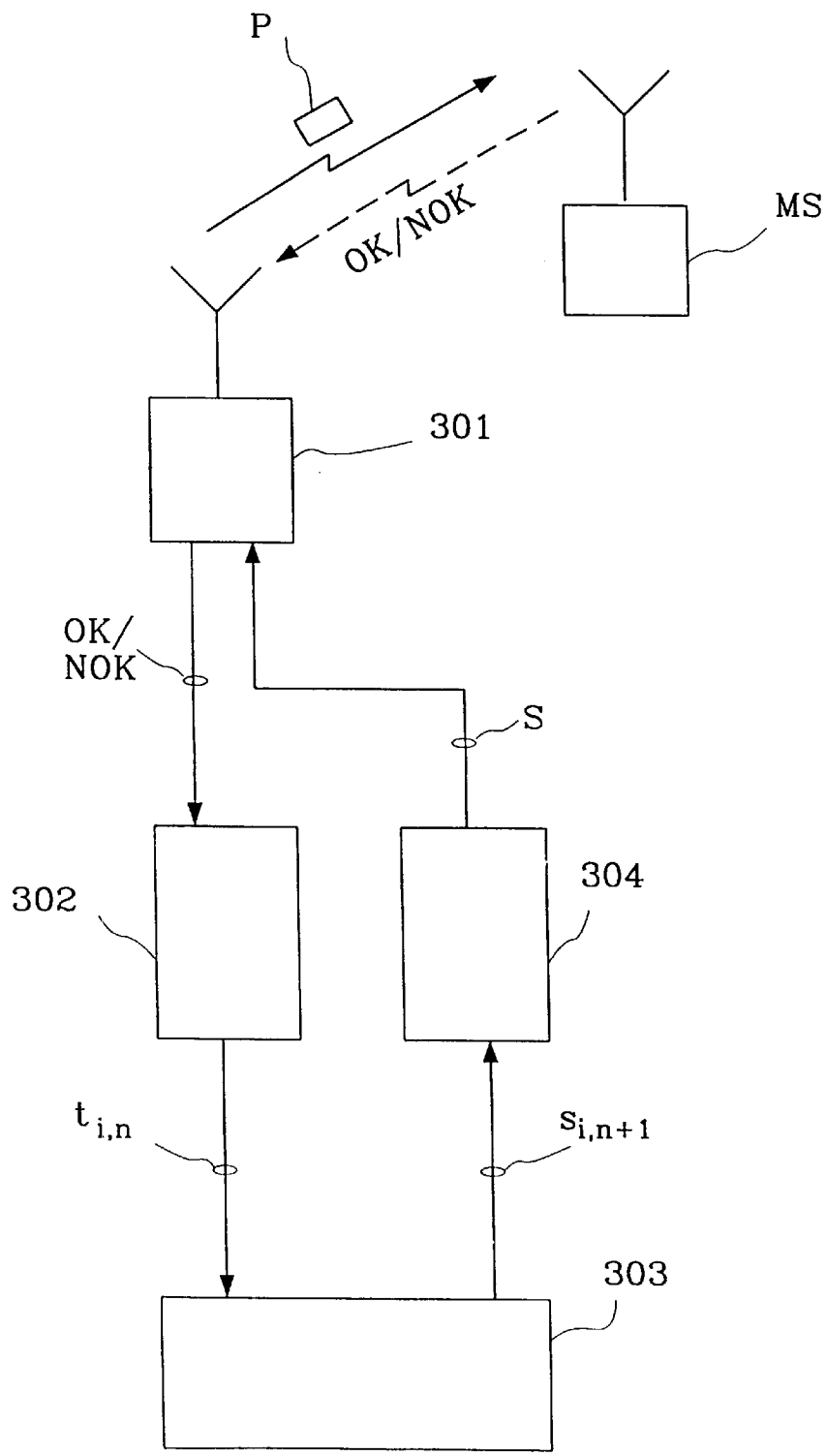
FIG. 3 illustrates an embodiment of an device controlling transmission of packet data according to the invention.

In FIG. 3 there is shown an embodiment of a device, controlling transmission of packet data according to the invention. In the present embodiment, the different parts in the device are comprised in a base station. The device is shown for the case which was described above when a base station transmits its packet data in the down link. The device comprises a combined transmitter- and receiver means 301, being able of transmitting and receiving information, for instance packet data, but also control information.

In the present embodiment, the control means 301 transmits at a certain point of time n packet data according to a transmission probability Si,n to a mobile station MS. When the mobile station has received the packet, it transmits a control message OK/NOK to the receiver means 301, said message containing information about if the transmitted packet has been correctly received OK or if it has not been correctly received NOK.

Furthermore, the device comprises a throughput means 302 for generation of values of the throughput fraction $t_{i,n}$, a random number generator 304 and an updating means 303, generating updated values of the transmission probability $s_{i,n+1}$ and controls said means above.

The throughput means 302 is arranged to, depending on messages, if the number of correctly received packets OK and the number of failed packets NOK, generate a value of the throughput fraction at the present point of time. The means 302 can for instance comprise mean value forming filters.

The generated value of the throughput fraction is transferred to the updating means 303. The updating means generates the starting value of the throughput fraction ti,o at index of time n=0. The updating means comprises means for execution of said previously disclosed mapping function f(a). The mapping function can be stored in a memory means and it can in such a case be changed if it is desirable. The updating means 303 generates values of the transmission probability $s_{i,n+1}$ by using said mapping function (8a) with the value of the throughput fraction $t_{i,n}$ at index of time n as input data. The updating means 303 generates all the time an index of time n, relating to the present time.

From the updating means 303 the updated value of the transmission probability $s_{i,n+1}$ is transferred to a random number generator 304. The random number generator 304 generates depending on said updated value of the transmission probability $s_{i,n+1}$ at randomly points of time signals S to the transmission means 301, said signals S indicating when to transmit a packet.

Figure 4:
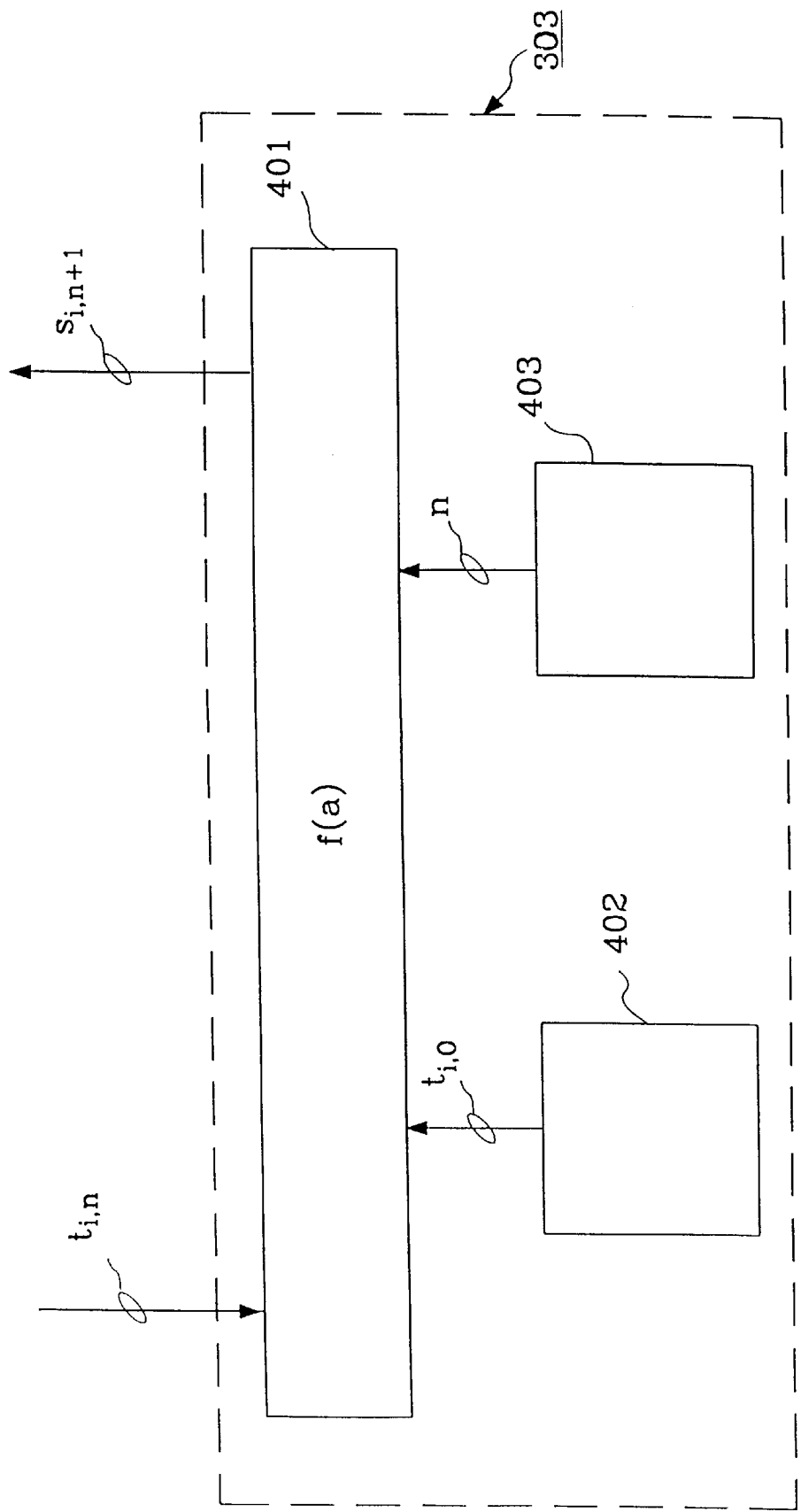
FIG. 4 illustrates an update means according to the invention.

In FIG. 4 the updating means 303 is illustrated according to an embodiment of the invention in more detail. The updating means 303 comprises a starting means 402 for generation of starting values $t_{i,0}$ of the throughput fraction, a counter means 403 for counting of an index of time n, indicating the present point of time, and a processor means 401.

The processor means 401 comprises means for executing the mapping function f(a). The processor means 401 receives information concerning the present value on the throughput fraction $t_{i,n}$. Initially, n=0, the processor means 401 receives a starting value of the throughput fraction $t_{i,0}$ from the starting value means 402. The starting value is a value between 0 and 1, which is randomized or chosen according to what is disclosed in FIG. 2. At later points of time n, the processor means 401 receives values of the throughput fraction $t_{i,n}$ from the throughput means 302.

The processor means 401 generates updated values of the transmission probability $s_{i,n+1}$ by inserting the present value of the throughput fraction of the function f(a); $a=t_{i,n}$, and execute the function.

The counter means 402 counts the index of time n, relating to the present point of time and the processor means 401 receives information about the present point of time.

Thus, according to the present invention, the transmission probability $s_{i,n+1}$ at a point of time n+1 for a transmitting station is updated, at transmission of packet data, depending on values of the throughput fraction $t_{i,n}$ of packets at an earlier point of time n for the transmitting station. Updated values of the transmission probability are achieved by execution of a mapping function f(a), in which the absolute value of the derivative f'(a) is less than 1, whereby the system becomes stable as regards co-channel interference, as earlier described by reference to FIG. 2.

From the updating means 303, the updated value of the transmission probability $s_{i,n+1}$ is transferred to the random number generator 304, whereafter the packet is transmitted according to the updated value of the transmission probability $s_{i,n+1}$, as described above.

It will be appreciated that said means do not have to be comprised in a base station. The updating means 303 can for instance be comprised in a base station controller.

Above, the device according to the invention has been described when transmission of packets occurs from the base station. It is obvious for a person skilled in the art that the same device also can be used for transmission of packets from a mobile station to a base station.

Thus, the method and the device according to the invention control transmission of packet data in a radio communication system, so that the transmission becomes fair between transmitting stations, successful in transferring a large fraction of packets and transmitting stations not successful in transferring an equal fraction of packets. By using the method and the device according to the invention, the radio communication system will be stabilized as regards co-channel interference.

What is claimed is:

1. A method for transmission of packet data in a cellular radio communication system comprising at least two transmitting radio stations and at least two receiving radio stations, whereby at least one channel is employed in the radio communication system for transmitting packet data between said transmitting and receiving radio stations, where each radio station, having packets to transmit, transmits packets with a particular transmission probability ($S_{i,n}$), whereby a particular fraction ($t_{i,n}$) of the transmitted packets is correctly received for each transmitting radio station, comprising the steps of:

a) choosing a mapping function (f(a)) depending on a variable (a), so the absolute value of the derivative of the function (f(a)) is less than 1 as the variable reaches values between 0 and 1;

b) continuously generating an updated value of the transmission probability ($s_{i,n+1}$) for each transmitting station by insertion of a value of the fraction correctly received packets ($t_{i,n}$) as variable (a) in said chosen mapping function (f(a)); and, c) transmitting packet data according to the updated value of the transmission probability.

2. A method according to claim 1, wherein said generation of an updated value of the transmission probability comprises the steps of:

a) generating a starting value of the fraction correctly received packets ($t_{i,0}$), said value being higher than zero and less than one;

b) generating an updated value of the transmission probability ($s_{i,n+1}$) by insertion of the value of the fraction correctly received packets as a variable in the chosen mapping function (f(a));

c) generating a value ($t_{i,n}$) of the fraction correctly received packets, said value being higher than 0 and less than 1, as transmission occurs simultaneously according to said determined value of the transmission probability ($s_{i,n+1}$); and, d) repeating the steps b–c.

3. A method according to claim 1, wherein said mapping function (f(a)) reaches values higher than 0 and less than 1.

4. A method according to claim 1, wherein said mapping function (f(a)) is a linear function.

5. A method according to claim 1, wherein the derivative of said function is higher than 0 and less than 1.

6. A method according to claim 1, wherein the derivative of said function is higher than −1 and less than 0.

7. A method according to claim 1, wherein said generation of a value ($t_{i,n}$) of the fraction correctly received packets comprises:

a) correctly receiving packets within a time interval; and, b) calculating a value of the fraction correctly received packets ($t_{i,n}$) for the transmitting station by weighted time mean value formation of the ratio between the number of correctly received packets and the number of transmitted packets.

8. A method according to claim 7, wherein said calculation of a value of the fraction correctly received packets ($t_{i,n}$) is performed in the transmitting station.

9. A method according to claim 7, wherein said calculation of a value of the fraction correctly received packets ($t_{i,n}$) is performed in the receiving station.

10. A device for transmission of packet data in a cellular radio communication system comprising at least two transmitting radio stations and at least two receiving radio stations, wherein at least one channel is employed in the radio communication system for transmitting packet data between said transmitting and receiving radio stations, wherein each radio station having packet data to transmit, transmits packet with a particular transmission probability ($s_{i,n}$), wherein a particular fraction ($t_{i,n}$) of the transmitted packets are correctly received for each transmitting radio station, said device comprising:

means for generation of a value of the fraction correctly received packets ($t_{i,n}$); and updating means for generation of an updated value of the transmission probability ($s_{i,n+1}$) depending on said value of the fraction correctly received packets ($t_{i,n}$);

transmission means for transmission of packet data according to the updated value of the transmission probability ($s_{i,n+1}$).

11. A device according to claim 10, wherein said updating means further comprises:

starting value means for generation of a starting value of the fraction correctly received packets ($t_{i,0}$); processor means for generation of an updated value of the transmission probability ($s_{i,n+1}$) by execution of a mapping function (f(a)), depending on a variable (a), wherein the absolute value of the derivative of the mapping function (f'(a)) is less than 1, as the variable (a) reaches values between 0 and 1, wherein the value of the fraction correctly received packets ($t_{i,n}$) is employed as said variable (a); and, calculating means for calculation of an index of time (n) indicating the present point of time.

12. A device according to claim 10, wherein the device further comprises: random number means for generation of a signal (S) activating the transmission of packets at randomly chosen points of time starting from said updated value of the transmission probability ($s_{i,n+1}$).

13. A device according to claim 10, wherein the device further comprises: to the means for generation of a value of the fraction correctly received packets ($t_{i,n}$).

* * * * *